United States Patent [19]

Shutt

[11] Patent Number: 5,411,623

[45] Date of Patent: May 2, 1995

[54] METHOD OF MANUFACTURING SOUND ABATEMENT BLANKETS WITH NON-OVERLAPPING SEAMS

[75] Inventor: Peter J. Shutt, Bakersfield, Calif.

[73] Assignee: Bravo Environmental, Inc., Bakersfield, Calif.

[21] Appl. No.: 104,473

[22] Filed: Jul. 28, 1993

[51] Int. Cl.⁶ .................... B32B 31/00; B32B 31/20; B32B 7/08

[52] U.S. Cl. ................ 156/290; 156/308.2; 428/74; 428/102; 428/284; 28/143; 112/266.1; 181/287

[58] Field of Search ............ 181/287, 290, 291, 296; 52/406, 809, 3, 63, 406.1, 406.2; 428/74, 81, 102, 920, 284; 156/290, 308.2; 112/405, 262.1, 266.1, 439; 28/158, 143, 164; 150/165, 168, 901

[56] References Cited

U.S. PATENT DOCUMENTS

| | | |
|---|---|---|
| 503,048 | 8/1893 | Jacobs . |
| 875,039 | 12/1907 | Beebe . |
| 1,095,340 | 5/1914 | Mattison . |
| 2,045,733 | 6/1936 | Spafford .............................. 428/920 |
| 2,419,971 | 5/1947 | Rumpf et al. ...................... 181/290 |
| 2,495,636 | 1/1950 | Hoeltzel et al. . |
| 2,962,129 | 11/1960 | Walton . |
| 3,003,599 | 10/1961 | Rubissow . |
| 3,226,935 | 1/1966 | Schneller . |
| 4,077,491 | 3/1978 | Hankel .............................. 181/290 |
| 4,085,789 | 4/1978 | Steiner et al. . |
| 4,193,474 | 3/1980 | Okubo et al. . |
| 4,214,646 | 7/1980 | Planes et al. . |
| 4,661,392 | 4/1987 | Kapstad .............................. 181/296 |
| 5,136,821 | 7/1992 | Child . |

FOREIGN PATENT DOCUMENTS

| | | |
|---|---|---|
| 407054 | 11/1970 | Australia . |
| 2734484 | 2/1979 | Germany . |
| 548707 | 9/1956 | Italy . |
| 355149 | 8/1931 | United Kingdom . |

Primary Examiner—Michael W. Ball
Assistant Examiner—Richard Crispino
Attorney, Agent, or Firm—Richard C. Litman

[57] ABSTRACT

A method of manufacturing sound abatement blankets is provided. As manufactured, the blanket has a polyvinylchloride outer shell, an inner membrane, an insulated peripheral flap, grommets disposed on the peripheral flap and a staggered, non-overlapping seam configuration connecting the outer shell with the inner membrane.

17 Claims, 8 Drawing Sheets

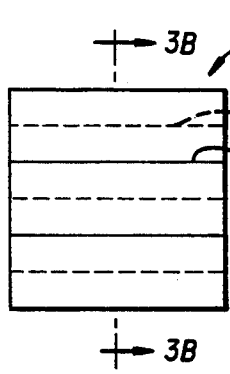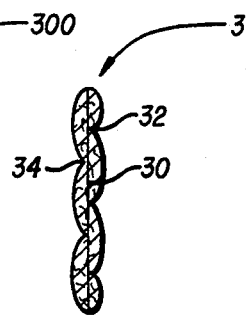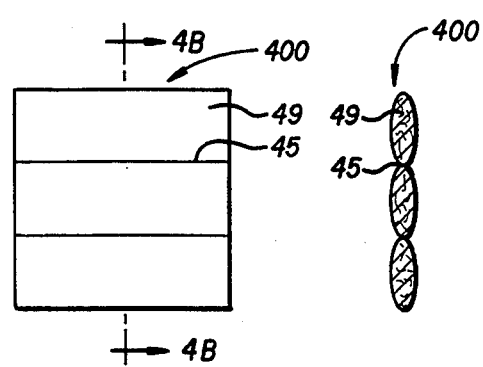
FIG. 3A    FIG. 3B    FIG. 4A    FIG. 4B
                     (PRIOR ART) (PRIOR ART)
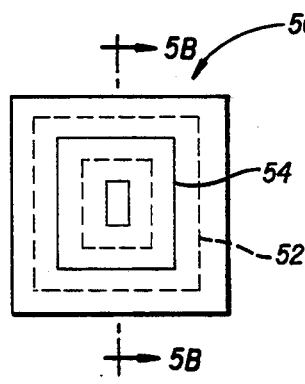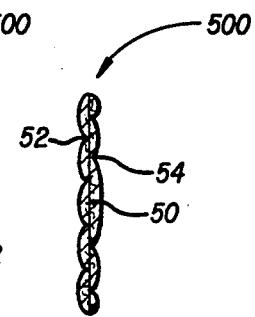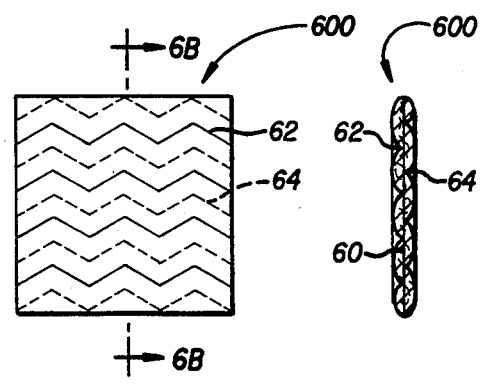
FIG. 5A    FIG. 5B    FIG. 6A    FIG. 6B
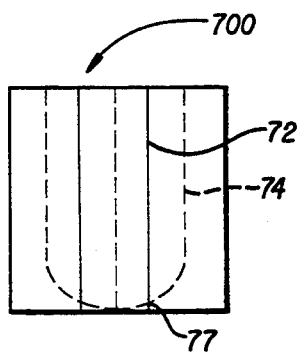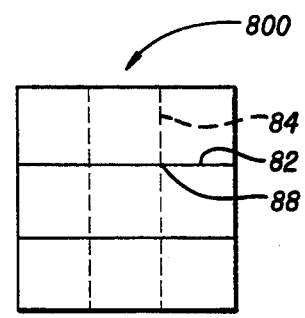
FIG. 7    FIG. 8

METHOD OF MANUFACTURING SOUND ABATEMENT BLANKETS WITH NON-OVERLAPPING SEAMS

FIELD OF THE INVENTION

The present invention generally relates to methods of manufacturing sound abatement blankets, and more particularly to methods of manufacturing such sound abatement blankets, where such sound abatement blankets have inner baffle membranes and staggered, non-overlapping seams.

BACKGROUND OF THE INVENTION

At a crucial turning point in the evolution of the U.S, industrial base, environmental awareness continues to escalate. While tangible point-source pollutants remain the primary concern of both governmental and non-governmental environmental organizations, recent trends indicate the growing and long-awaited recognition of the adverse effects of noise pollution. Industrial noise in both densely populated cities and in pristine environmental settings continues to receive much attention. While related federal legislation remains incipient, several state and local legislatures, foreboding enhanced federal oversight, have commenced implementation of legislation expressly directed towards regulating and maintaining environmental noise levels. Unfortunately, to comply with such legislation, civil engineering and construction industries are presently afforded with few, costly, and often inadequate means to achieve required noise reduction levels.

While noise reduction devices have been the subject of previous patents, such conventional devices were originated in unrelated fields, and accordingly, had limited applicability to comparatively large industrial-scale civil engineering projects which require precise reduction of noise.

U.S. Pat. No. 4,214,646, issued to Felipe Planes et al. on Jul. 29, 1980, sets forth a rigid, inflexible acoustic panel utilized as space dividers in an office environment. Planes' acoustic panels are single units, consisting of two-half panels placed face-to-face with an air space separating the halves. When used to construct a larger acoustic barrier, several half panels are rigidly staggeredly joined together with hidden connectors. Again, an air space is provided in the middle of each half panel to moderate the acoustic performance of the space dividers.

In view of the required structural rigidity of Planes' acoustical panels, implementation of Planes' narrowly designed concepts in industrial-scale noise reduction projects would be costly and clearly impractical. Further while Planes teaches towards the utilization of inter-panel air spaces, it is believed that much better sound abatement could be achieved in the industrial context through the use of an inner membrane operating as a sound baffle.

Unlike Planes, W. German Offenlegungsshrift 2,734,484, invented by Norbert Colberg and published on Feb. 8, 1979, sets forth a noise reduction device more typically found in the industrial context. More specifically, Colberg discusses a roadside noise barrier. Colberg' barrier consists of several rigid components requiring comparatively significant amounts of time and labor to both manufacture and to subsequently construct into a finished roadside noise barrier.

Italian Patent 548,707, issued to George A. Ruhssow on Sep. 29, 1956, is believed to encompass insulation designed to resist strain of tension and compression. The packaging material is believed also to have thermal and sound insulating qualities.

In view of the several deficiencies in the art, the present invention provides a method of manufacturing sound abatement blankets, which were developed to provide an effective and economical answer to the long felt, but heretofore unsolved need of reducing industrial noise. None of the above noted patents or cited prior art, either singly or in combination, are seen to disclose the specific arrangement of concepts disclosed by the present invention.

SUMMARY OF THE INVENTION

The acoustical blankets manufactured by the process described and claimed herein, are a state of the art design in sound abatement barriers. Based on empirical data, the blankets are believed to have sound abatement attributes superior to any existing noise barrier known to applicant. For the purposes of noise reduction, the blankets fully conform with existing California Construction Building Codes. Aside from significantly enhanced sound absorbing and deflecting qualities, the blankets are also engineered to withstand severe and/or prolonged intemperate weather conditions. The blankets are further provided with an industrially appropriate level of fire-resistance.

In the principle embodiments, the blankets are generally manufactured from polyvinylchloride outer shells and a similarly manufactured inner membrane which operates as an internal sound baffle. The outer-shell is connected to the inner membrane with a unique configuration of staggered, non-overlapping seam junctures.

Accordingly, one of the objects of the present invention is to provide methods of manufacturing sound abatement blankets with enhanced sound absorbing and deflecting qualities.

Another of the objects of the present invention is to provide methods of manufacturing sound abatement blankets with an inner membrane that operates as an internal sound baffle.

Another of the objects of the present invention is to provide methods of manufacturing sound abatement blankets with staggered, non-overlapping seam junctures which improve the blanket's sound abatement attributes.

Another of the objects of the present invention is to provide methods of manufacturing sound abatement blankets having a unitary construction.

With these and other objects in view, which will more readily appear as the nature of the invention is further described below, the invention consists in the novel combination and arrangement of steps hereinafter more fully described, illustrated and claimed with reference being made to the attached drawings.

BRIEF DESCRIPTION OF THE DRAWINGS

Understanding of the present invention and the various aspects thereof will be facilitated by reference to the accompanying drawing figures, submitted for purposes of illustration only and not intended to define the scope of the invention, on which:

FIG. 3A illustrates a schematic transparent front view of an embodiment of the sound abatement blanket.

FIG. 3B illustrates a schematic cross-sectional view of the embodiment illustrated in FIG. 3A taken along line 3B.

FIG. 4A illustrates a schematic transparent front view of a prior art noise barrier.

FIG. 4B illustrates a schematic cross-sectional view of the embodiment illustrated in FIG. 4A taken along line 4B.

FIG. 5A illustrates a schematic transparent front view of an alternative modified embodiment of the sound abatement blanket.

FIG. 5B illustrates a schematic cross-sectional view of the alternative modified embodiment illustrated in FIG. 5A taken along line 5B.

FIG. 6A illustrates a schematic transparent front view of another alternative modified embodiment of the sound abatement blanket.

FIG. 6B illustrates a schematic cross-sectional view of the alternative modified embodiment illustrated in FIG. 6A taken along line 6B.

FIG. 7 illustrates a schematic transparent view of another alternative modified embodiment of the sound abatement blanket.

FIG. 8 illustrates a schematic transparent view of another alternative modified embodiment of the sound abatement blanket.

Similar reference characters designate corresponding parts throughout the several figures of the drawings.

DETAILED DESCRIPTION OF THE INVENTION

The present acoustical blankets are a state of the art design in sound control. Having outer covers specifically connected to an inner membrane, the blankets have been laboratory and field tested to achieve superior performance in sound abatement.

The invention will now be further described with reference to the Figures.

Figures 1A, 1B, 1C:
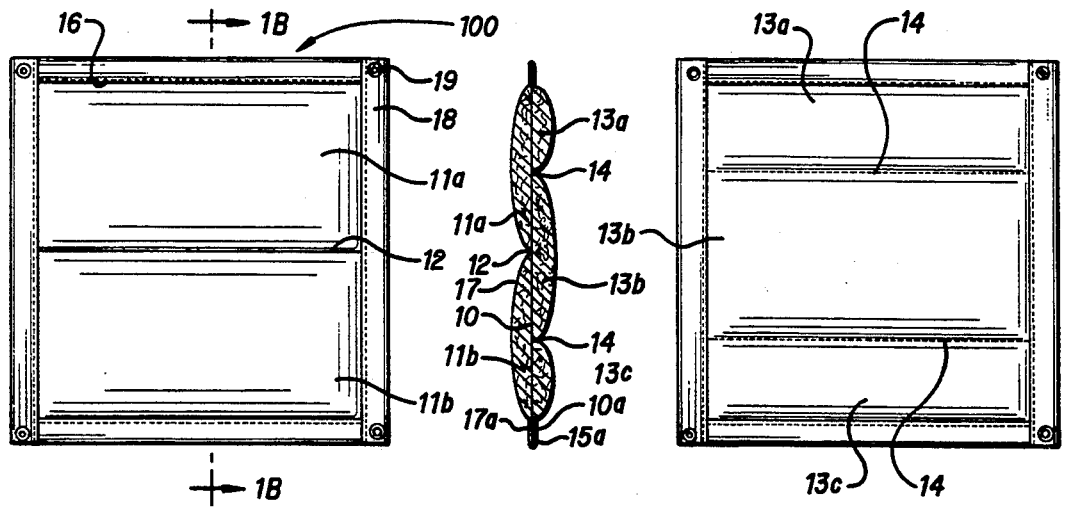
FIG. 1A illustrates a view of one side of a first principle embodiment of a sound abatement blanket.
FIG. 1B illustrates a cross-sectional view of the embodiment of the sound abatement blanket illustrated in FIG. 1A taken along line 1B.
FIG. 1C illustrates a view of the other side of the embodiment of the sound abatement blanket illustrated in FIG. 1A.

FIGS. 1A, 1B and 1C illustrate a representative first principle embodiment of the present invention. In the first principle embodiment, sound abatement blanket 100 is generally comprised of an inner membrane interposed between a front cover 17 and a back cover 15. Front cover 17 is interiorly connected to inner membrane 10 at interior front seam juncture 12. Back cover 15 is interiorly connected to inner membrane 10 at interior back seam juncture 14. As will be further described below, interior front seam juncture 12 is substantially non-overlapping with interior back seam juncture 14.

As also shown in FIGS. 1A, 1B, and 1C, sound abatement blanket 100 has a peripheral flap 18 bordering the periphery of sound abatement blanket 100. Peripheral flap 18 is created by connecting inner membrane 10, front cover 17 and back cover 15 at peripheral seam juncture 16. As shown in FIGS. 1A and 1C, peripheral seam juncture 16 is interiorly offset from the outermost edges of sound abatement blanket 100. In light of its manufacture, and as shown in FIG. 1B, peripheral flap 18 has three layers comprising outermost front cover edge 17a outermost inner membrane edge 10a and outermost back cover edge 15a. In other embodiments, the spaces between outermost front cover edge 17a and outermost inner membrane edge 10a and between outermost back cover edge 15a and outermost inner membrane edge 10a may be filled with sound abatement insulation, the composition of which is described in further detail below. As shown in FIGS. 1A and 1C, peripheral flap 18 is provided with a plurality of grommets 19. As described further below, the grommets 19 are used as means to either connect the sound abatement blanket 100 to a frame or to another sound abatement blanket.

As also shown in FIGS. 1A, 1B, and 1C, sound abatement blanket 100 has a plurality of front pockets 11a, 11b and back pockets 13a, 13b, 13c. The relative configuration of front pockets 11a, 11b and back pockets 13a, 13b, 13c may be described as staggered. Each of front pockets 11a, 11b and back pockets 13a, 13b, 13c are filled with sound abatement insulation, the composition of which is decried in further detail below.

Each of front pockets 11a, 11b are planarly defined by front cover 17 and inner membrane 10 and laterally defined by by peripheral seam 16 and interior front seam juncture 12. As shown in FIG. 1B, inner membrane 10 can be planar. In larger embodiments of sound abatement blanket 100 having more than one interior front seam juncture, lateral definition may also occur respective to interior front seam juncture 12 and another interior front seam juncture. Each of back pockets 13a, 13b, 13c are planarly defined by back cover 15 and inner membrane 10 and laterally defined by either peripheral seam juncture 16 and an adjacent interior seam juncture 14 (e.g., back pockets 13a and 13c) or two adjacent interior seam junctures 14 (e.g., back pocket 13b).

Figures 2A, 2B, 2C:
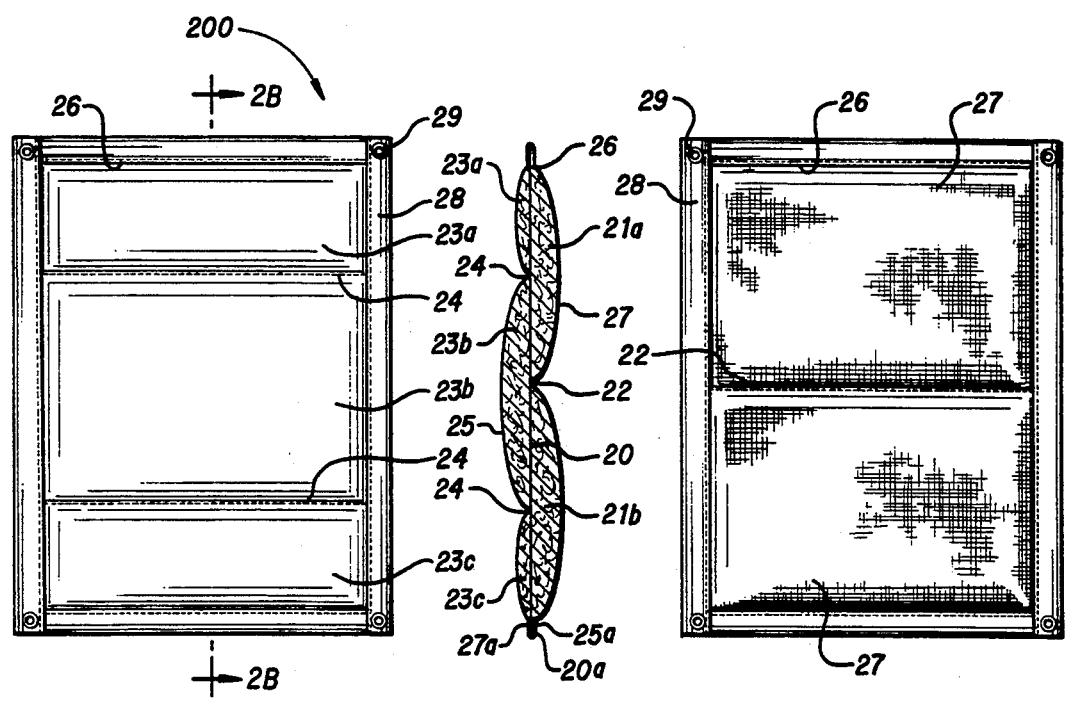
FIG. 2A illustrates a view of one side of a second principle embodiment of a sound abatement blanket.
FIG. 2B illustrates a cross-sectional view of the embodiment of the sound abatement blanket illustrated in FIG. 2A taken along line 2B.
FIG. 2C illustrates a view of the other side of the embodiment of the sound abatement blanket illustrated in FIG. 2A.

FIGS. 2A, 2B and 2C illustrate a representative second principle embodiment of the present invention, which shares several features similar to the first principle embodiment as represented by sound abatement blanket 100. In the second principle embodiment, sound abatement blanket 200 is generally comprised of an inner membrane 20 interposed between a front cover 27 and a back cover 25. Front cover 27 is interiorly connected to inner membrane at interior front seam juncture 22. Back cover 25 is interiorly connected to inner membrane 10 at interior back seam juncture 24. As will be further described below, interior front seam juncture 22 is substantially non-overlapping with interior back seam juncture As also shown in FIGS. 2A, 2B, and 2C, sound abatement blanket 200 has a peripheral flap 28 bordering the periphery of sound abatement blanket 200. Peripheral flap 28 is created by connecting inner membrane 20, front cover 27 and back cover 25 at peripheral seam juncture 26. As shown in FIGS. 2A and 2C, peripheral seam juncture 26 is interiorly offset from the outermost edges of sound abatement blanket 200. In light of its manufacture, and as shown in FIG. 2B, peripheral flap 28 has three layers comprising outermost front cover edge 27a, outermost inner membrane edge 20a and outermost back cover edge 25a. In other embodiments, the spaces between outermost front cover edge 27a and outermost inner membrane edge 20a and between outermost back cover edge 25a and outermost inner membrane edge 20a may be filled with sound abatement insulation, the composition of which is described in further detail below. As shown in FIGS. 2A and 2C, peripheral flap 28 is provided with a plurality of grommets 29. As described further below, the grommets 29 are used as means to either connect the sound abatement blanket 200 to a frame or to another sound abatement blanket.

As also shown in FIGS. 2A, 2B, and 2C, sound abatement blanket 200 has a plurality of front pockets 21a, 21b and back pockets 23a, 23b, 23c. The relative configuration of front pockets 21a, 21b and back pockets 23a 23b, 23c may be described as staggered. Each of front pockets 21a, 21b and back pockets 23a, 23b, 23c are filled with sound abatement insulation, the composition of which is described in further detail below.

Each of front pockets 21a, 21b are planarly defined by front cover 27 and inner membrane 20 and laterally defined by peripheral seam 26 and interior front seam juncture 22. In larger embodiments of sound abatement blanket 200 having more than one interior front seam juncture, lateral definition may also occur respective to interior front seam juncture 22 and another interior front seam juncture. Each of back pockets 23a, 23b, 23c are planarly defined by back cover 25 and inner membrane 20 and laterally defined by either peripheral seam juncture 26 and an adjacent interior seam juncture 24 (e.g., back pockets 23a and 23c) or two adjacent interior seam junctures 24 (e.g., back pocket 23b).

Although sharing several similar features, sound abatement blanket 100 and sound abatement blanket 200 or distinct embodiments of the present invention. The distinction lay in back cover 17 of sound abatement blanket 100 and back cover 27 of sound abatement blanket 200. In sound abatement blanket 100, back cover 17 is made of a unitary sheet type material. With this feature, sound abatement blanket 100 is able to achieve an NRC rating of 0.50. While sound abatement blanket 100 has comparatively modest absorption qualities, it is remarkably effective as a barrier to block out sound. The sound transmission class of sound abatement blanket 100 is STC-25.

In contrast, in sound abatement blanket 200, back cover 27 is made of a weave type material. One preferred weave type material is marketed as 60% PHIFERTEX weave. It is noted, however, that while 60% weave type materials are generally preferred, 60% is not presently believed to be crucial to the practice of the embodiment represented by sound abatement blanket 200. Configured with a 60% weave, sound abatement blanket 200 is able to achieve a remarkable NRC rating of 1.0. The sound transmission class of sound abatement blanket 200 is STC-18.

FIGS. 3A and 3B illustrate a schematic representation of the inventive sound abatement blanket. As cross-sectionally illustrated in FIG. 3B, schematic sound abatement blanket 300 comprises an inner membrane 30 with an interior back seam juncture 32 and an interior front seam juncture 34. The relative locations of interior back seam juncture 32 and interior front seam juncture 34 with reference to the primary plane of schematic sound abatement blanket 300 is schematically diagramed in FIG. 3A. As clearly shown in FIG. 3A, interior back seam juncture 32 and interior front seam juncture 34 are absolutely non-overlapping, i.e. at no point does interior back seam juncture 32 intersect interior front seam juncture 34. Such a configuration distinctly contrasts with prior art barrier 400 schematically represented in FIGS. 4A and 4B.

As shown in FIGS. 4A and 4B, prior art barrier 400 has a single seam drawn through the entire its width. In theory, a twin seam barrier that produces such a configuration could be described as having absolutely overlapping seams. Configured as such, it is believed that transmission of sound is not effectively and/or efficiently absorbed or deflected in the immediate areas surrounding seam 45. In view of prior art barrier 400, under one view, the term "substantially non-overlapping" is defined as not including seams that are "absolutely overlapping". In this regard, several seam configuration can be extrapolated that fall within the teachings of the present invention.

For example, as illustrated in FIGS. 5A and 5B, a modified sound abatement blanket 500 may be manufactured so that neither interior back seam juncture 52 nor interior front seam juncture 54 fully transverse the width of blanket 500. Regardless, interior back seam juncture 52 and interior front seam juncture 54 remain substantially non-overlapping.

In the same vein, the present invention does not require interior back seam juncture 62 and/or interior front seam juncture 64 to be linear. For example, in modified sound abatement blanket 600 illustrated in FIGS. 6A and 6B, both interior back seam juncture 62 and interior front seam juncture 64 are manufactured in a zig-zag configuration, yet remain substantially non-overlapping.

While the term substantially non-overlapping should be defined with reference to the totality of the present specification in view of the objectives of the present invention, it is noted that the term encompasses seam configurations wherein a front seam juncture intersects with a back seam juncture at an intersection point. For example, as schematically illustrated in FIG. 7, variant sound abatement blanket 700 has interior back seam juncture 72 and interior front seam juncture 74 intersecting at a single juncture intersection point 77. In the same vein, as schematically illustrated in FIG. 8, variant sound abatement blanket 800 has interior back seam juncture 82 intersecting with interior front seam juncture 84 at juncture intersection point 88. The seam juncture configuration of both variant sound abatement blankets 700 and 800 are substantially non-overlapping.

The respective seam junctures the principle sound abatement blankets 100, 200, the modified sound abatement blankets 500 and 600 and the variant sound abatement blankets 700, 800 are preferably substantially non-overlappingly manufactured by conventional methods of stitching. However, other means of seam juncture manufacture are possible. For example, the seam junctures may be created by substantially non-overlappingly gluing the pertinent outer cover to the inner membrane. Alternatively, the seam junctures may also be created by substantially nonoverlappingly fusing the pertinent outer cover to the inner membrane. Both gluing and fusing may be accomplished through conventional methods.

As to the materials used to manufacture the inner membrane and the outer coverings, several varieties of materials may be utilized consonant with the scope of the present invention. However, positive results have be accomplished with the use of an L18KU polyvinylchloride sheet material. Depending one's specific needs, other alternative materials such as burlap, acrylics, polyesters and the like may also be utilized. Where fire retardancy and abrasion resistance are important, chemically treated polyesters or woven fiberglass may also be used.

As to the sound abatement insulation used to fill the sound abatement blankets, several varieties of insulation may be utilized consonant with the scope of the present invention. However, positive results have been with the use of fiberglass insulation having an R-11 insulation factor. In general, however, the sound abatement insulation can be composed of any material (preferably having high fire resistance) which has the capability of absorbing sound, e.g. mineral wool, treated cellulose, etc.

In embodiments where the sound abatement blanket contains particulate sound abatement insulation, seam junctures should be substantially horizontal or otherwise capable of reasonably retaining the particulate insulation in place. In this regard, it is noted that in large sound abatement blankets with large pockets defined by vertical seam junctures, particulate sound abatement insulation may aggregate in the bottom most areas of the sound abatement blanket. The resultant non-homogenous dispersal of insulation may cause "loud spots" in the upper regions of the blanket sue to increased sound transmission.

The flame resistance of the principle embodiments of the sound abatement blankets have been tested in accordance with California Flame resistance Method 5903 and has been classified as a flame retardant to California Fire Marshall F-102.4. The test determined the blankets as having an afterflame of 2 seconds with a Char Length of 3.5 inches. The test concluded that the blankets have a working temperature range of −40° F. to 200° F.

In addition to flame resistance, the blankets were severally tested to determine their operability and received exceptional results far greater than expected. These tests are 15 describe further below.

EXPERIMENTAL STUDIES AND RESULTS
1A. SOUND TRANSMISSION LOSS TEST

The method and procedures used for this test conformed to the provisions and requirements of ASTM Procedure E90-90, "Standard Test Method for Laboratory Measurement of Airborne Sound Transmission Loss Of Building Partitions". The test chamber source and receiving room volume were 79.9 and 78 cubic meters, respectively.

1B. DESCRIPTION OF TEST SPECIMEN

The test specimen consisted of a sample representative of sound abatement blanket 100. The overall dimensions of the specimen were 95-¾ inches (2.43 m) wide by 80-⅜ inches (2.05 m) high. The specimen weighed 38½ lbs (17.5 Kg) for a calculated surface weight of 0.72 lbs./ft$^2$ (3.5 kg/m$^2$). Wood furring strips consisting of 2"×4" were screwed to the test opening around the entire perimeter. The specimen was nailed to these furring strips through grommet holes. Finishing strips were used to secure the specimen against the furring strips and cover the grommet holes around the entire perimeter. The finishing strips consisted of wood 1"×2" which were nailed through the edge of the specimens into the wood furring strips.

1C. RESULTS OF THE MEASUREMENT

Figure 16:
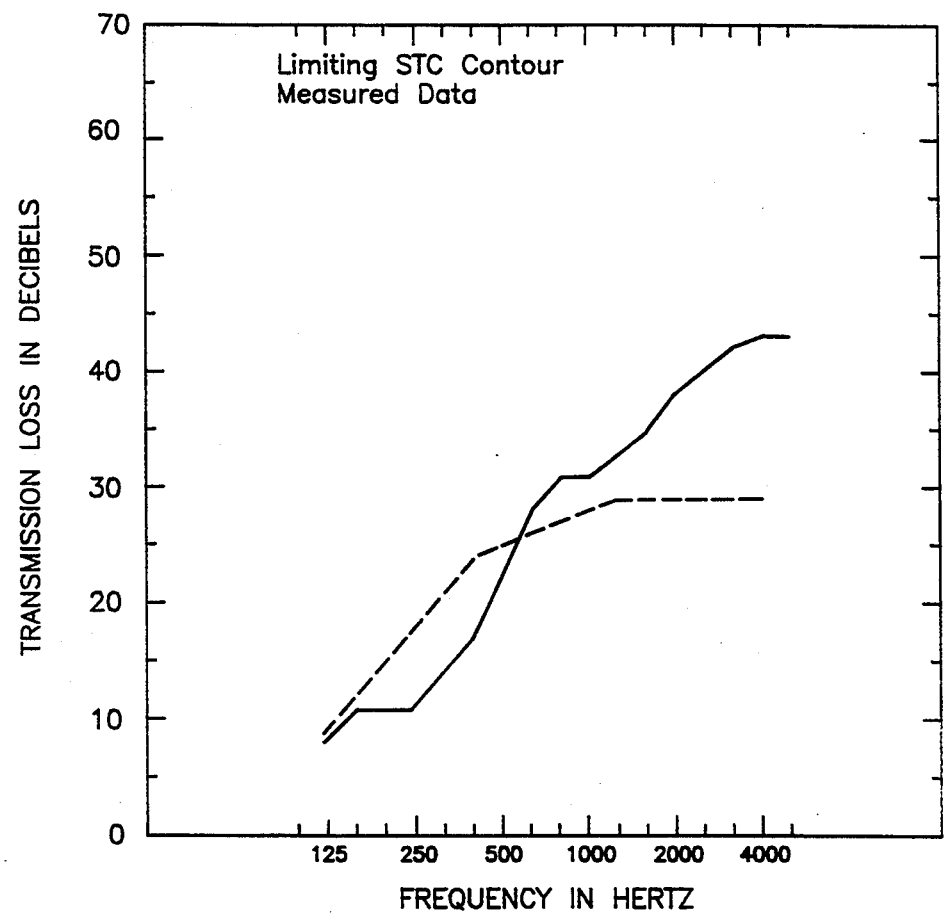
FIG. 16 illustrates a graph depicting the empirical sound abatement characteristics the embodiment of the sound abatement blanket illustrated in FIG. 1A.

The sound transmission loss values at 17 one-third octave bands are tabulated and illustrated in FIG. 16. The Sound Transmission Class rating determined in accordance with ASTM E-413 was STC-25.

2A. SOUND ABSORPTION TEST

The methods and procedure used for this test conform to the provisions and requirements of ASTM procedure C423-90a, "Standard Test Method for Sound. Absorption and Sound Absorption Coefficients by the Reverberation Room Method."

2B. DESCRIPTION OF THE TEST SPECIMEN

The test specimen consisted of a sample representative of sound abatement blanket 100. The specimen was clamped to a test jig, back cover 15 side up, in an E-400 mounting, 16 inches above the chamber floor. The jig consisted of four wooden sides such that the air space below the specimen was completely enclosed. Closed cell foam gaskets were used to provide an air tight seal between the chamber floor and the bottom of the jig. The overall dimensions of the specimen were 96 inches (2.44 m) by 83 inches (2.11 m) by approximately 4 inches (102 mm) thick. The overall weight of the specimen was 52 lbs (23.6 Kg) for a calculated surface density of 0.94 lbs.ft$^2$ (4.59 Kg/m2).

2C. TEST RESULTS

| Area Tested: 55.33 sq. ft. | Mounting per ASTM 795: Type E-400 ⅓ Octave Band Center Frequency (Hz) | | | | | | |
| --- | --- | --- | --- | --- | --- | --- | --- |
|  | 125 | 250 | 500 | 1000 | 2000 | 4000 | NRC |
| Sound Absorption (Sabins) | 36.3 | 45.4 | 30.1 | 19.0 | 14.2 | 11.1 | |
| Sound Absorption Coefficient | .66 | .82 | .54 | .34 | .26 | .20 | .50 |
| 95% Confidence | .12 | .07 | .06 | .04 | .03 | .04 | |

3A. SOUND TRANSMISSION LOSS TEST The methods and procedures used for this test conform to the provisions and requirements of ASTM Procedure E90-90, "Standard Test Method for Laboratory Measurement of Airborne Sound Transmission Loss of Building Partitions". The test chamber source and receiving room volume are 79.9 and 78 cubic meters, respectively.

3B. DESCRIPTION OF TEST SPECIMEN

The test specimen consisted of a sample representative of sound abatement blanket 200. The overall dimensions of the specimen were 72 inches wide by 48 inches high. The specimen weighed 10 lbs. for a calculated surface weight of 0.42 lbs./sq.ft. Wood furring strips consisting of 2"×4" s were screwed to the test opening around the entire perimeter. The specimen was nailed to these furring strips through grommet holes. Finishing strips were used to secure the specimen against the furring strips and cover the grommet holes around the entire perimeter. The finishing strips consisted of wood 1"×2" s with a self adhesive strip of 1-¼ inch by ⅛ inch foam with a thin plastic face covering. The finishing strips were nailed through the edge of the specimen into the wood furring strips.

3C. RESULTS OF THE MEASUREMENT

Figure 15:
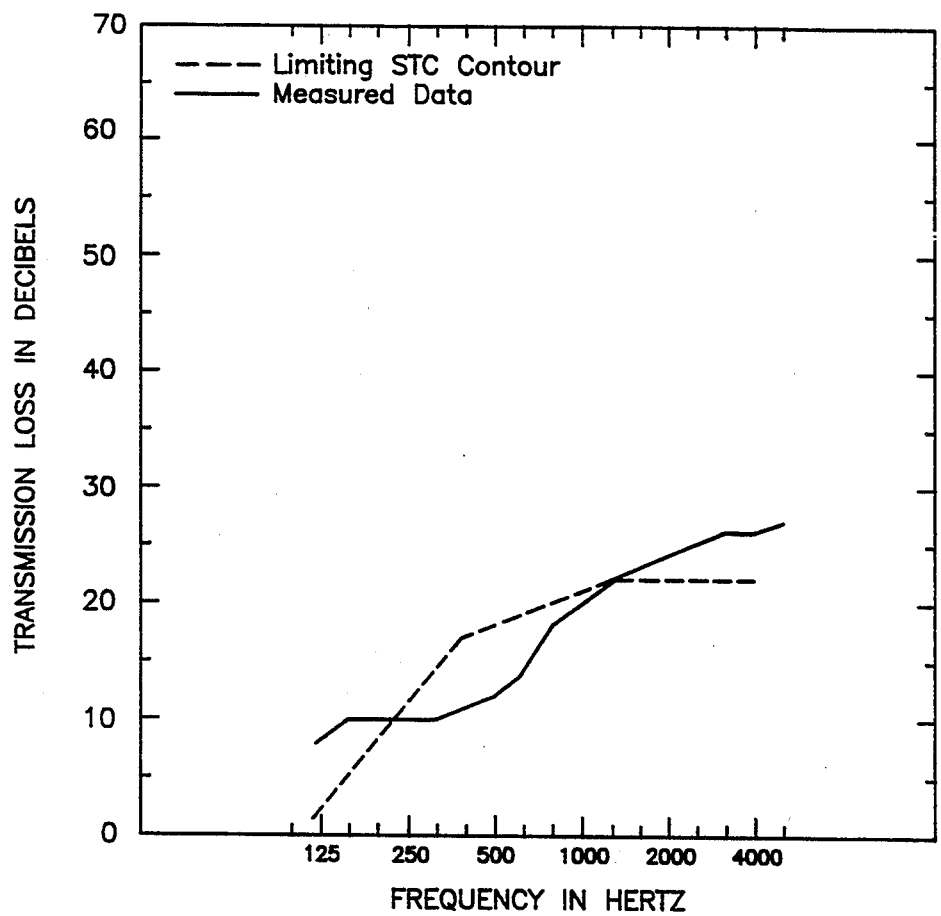
FIG. 15 illustrates a graph depicting the empirical sound abatement characteristics the embodiment of the sound abatement blanket illustrated in FIG. 2A.

The sound transmission loss value at 17 one-third octave bands are tabulated and illustrated in FIG. 15. The Sound Transmission Class rating determined in accordance with ASTM E-13 was STC-18.

4A. SOUND ABSORPTION TEST

The methods and procedure used for this test conformed to the provisions and requirements of ASTM procedure C423-90a, "Standard Test Method for Sound Absorption and Sound Absorption Coefficients by the Reverberation Room Method".

4B. DESCRIPTION OF THE TEST SPECIMEN

The test specimen consisted of a sample representative of sound abatement blanket 200. The specimen was clamped to a test 10 jig, back cover 27 side up, in an E-400 mounting, 16 inches above the chamber floor. The jig consisted of four wooden sides such that the air space below the specimen was completely enclosed. Closed cell foam gaskets were used to provide an air tight seal between the chamber floor and the bottom of the jig. The overall dimensions of the specimen were 96 inches (2.44 m) by 83 inches (2.11 m) by approximately 4 inches (102 mm) thick. The overall weight of the specimen was 49 lbs (22.2 Kg) for a calculated surface density of 0.89 lbs./ft$^2$ (4.32 Kg/m$^2$).

4C. TEST RESULTS

| Area Tested: 55.33 sq. ft. | Mounting per ASTM 795: Type E-400 ⅓ Octave Band Center Frequency (Hz) | | | | | | |
|---|---|---|---|---|---|---|---|
| | 125 | 250 | 500 | 1000 | 2000 | 4000 | NRC |
| Sound Absptn. (Sabins) | 42.9 | 50.2 | 57.4 | 57.0 | 57.0 | 54.4 | |
| Sound Absptn. Coeff. | 00.78 | 00.91 | 01.04 | 01.03 | 01.03 | 00.98 | 1.00 |
| 95% Confidence | 00.14 | 00.07 | 00.06 | 00.06 | 00.05 | 00.05 | |

The present sound abatement blankets may be utilized effectively in a variety of ways, such as in the construction of wrap-around barriers, complete enclosures, curtains, and free standing noise containment walls. These method of utilization will be described with reference to FIGS. 9, 10, 11, 12, 13 and 14.

Figure 10:
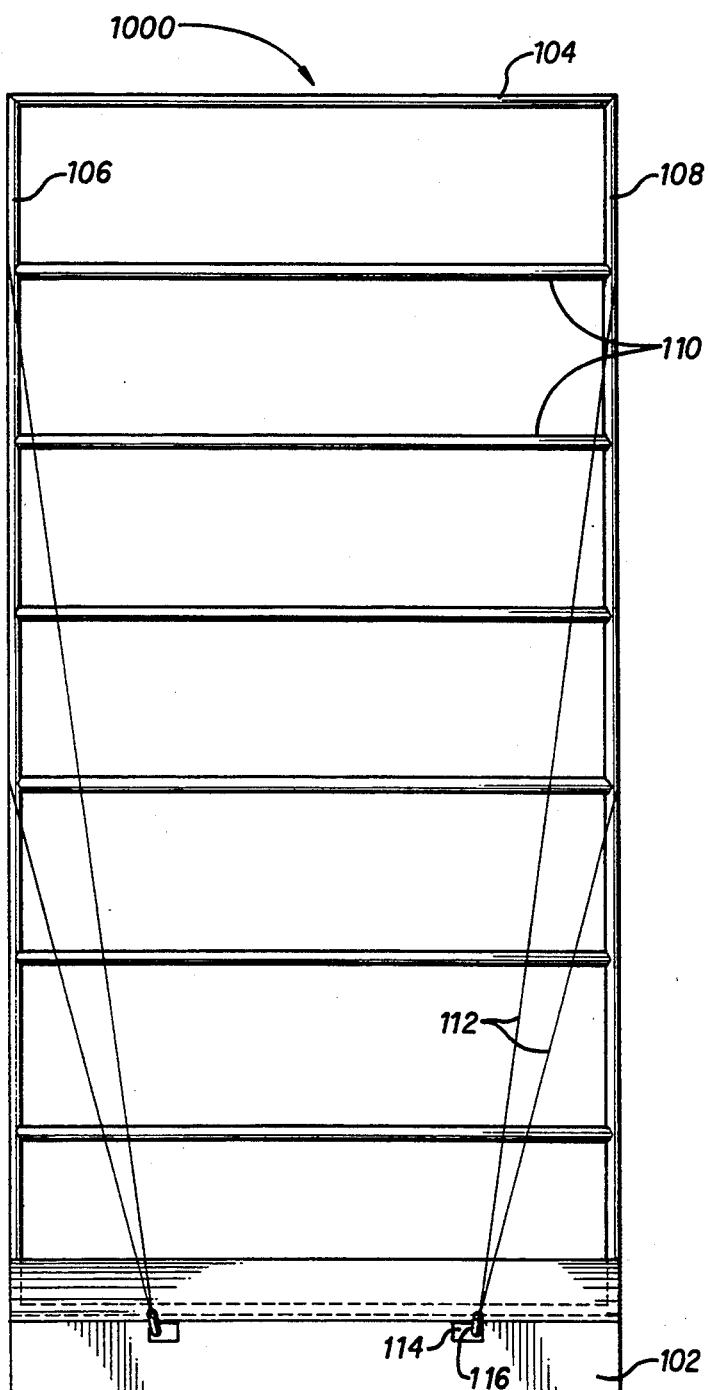
FIG. 10 illustrates a front, partially transparent view of an embodiment of one noise reducing unit with sound abatement blankets removed.
Figure 11:
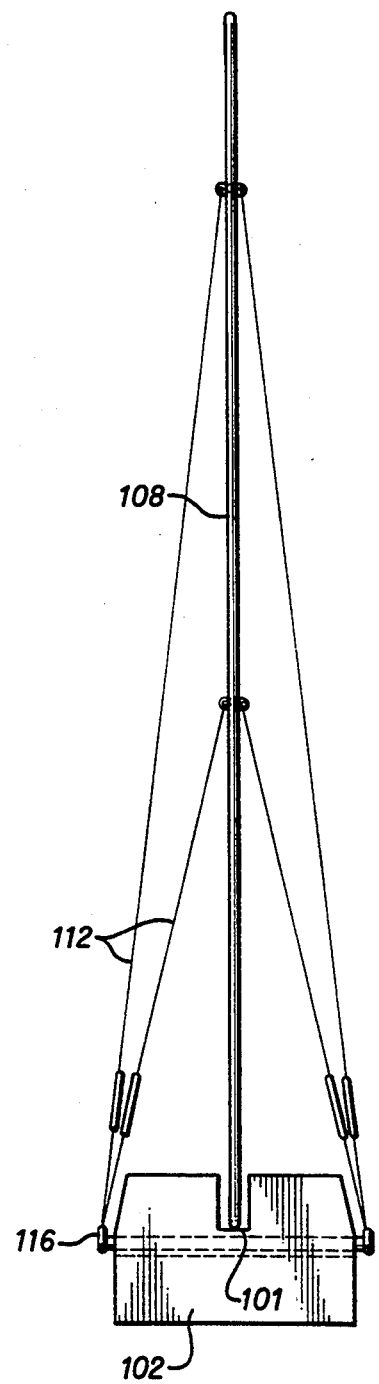
FIG. 11 illustrates a side, partially transparent view of the noise reducing unit embodiment illustrated in FIG. 10.

FIGS. 10 and 11 illustrates a frame assembly 1000 that may be used together with sound abatement blankets 100, 200, modified sound abatement blankets 500, 600, and variant sound abatement blankets 700, 800, (collectively hereinafter, "sound abatement blankets") to form noise reducing units.

Frame assembly 1000 comprises a base 102 and an upright frame. The upright frame is comprised of a left side elongate member 106, a right side elongate member 108, and a top elongate member 104. Left side elongate member 106, right side elongate member 108, and top elongate member 104. For structural integrity the upright frame may also be provided with a plurality of horizontal frame members 110 should be manufactured of a light weight but relatively sturdy material. Aluminum tubing has been used with positive results. Further, while horizontal frame members are preferably horizontal, it is not required. Alternative configurations may be envisioned in accordance with the goals of the present invention.

Figure 12:
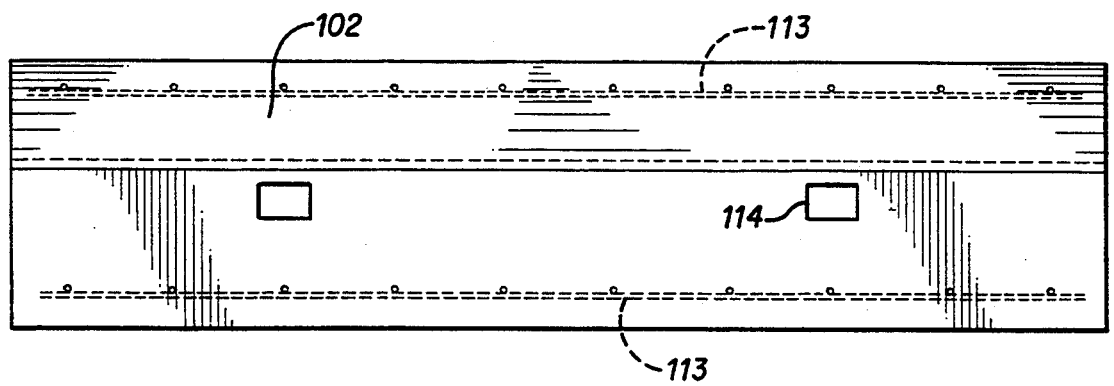
FIG. 12 illustrates a front, partially transparent view of a base used in one possible embodiment of a noise reducing unit.
Figure 13:
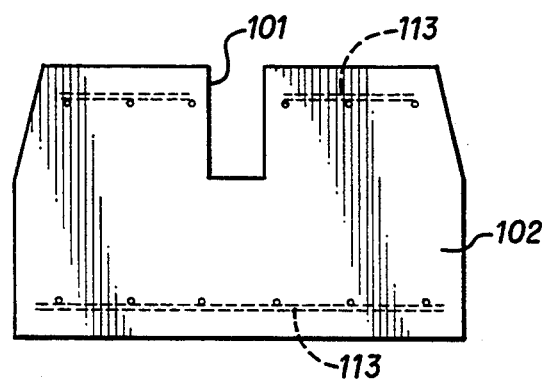
FIG. 13 illustrates a side, partially transparent view of the base illustrated in FIG. 12.

With reference to FIGS. 11, 12 and 13, base 102 is typically manufactured from concrete such that a horizontal groove 101 is provided through its central top axis. The groove has a dimensions capable of supporting the frame assembly in a relatively sturdy upright position. As shown in FIGS. 12 and 13, base 102 may be further reinforced by a network of reinforcing members 113. Rebar may be used in this regard. In certain circumstance wherein a more permanent construction is desired, base 102 may be equivalently substituted with the ground underlying the construction site, (See e.g., FIG. 14, ground B). As shown in FIG. 12, base 102 is also comprised of a plurality of cross-lateral throughways 114. As shown in FIG. 11, the cross-lateral throughway are used to contain a elongate wire anchor 116.

As shown in FIGS. 10 and 11, frame assembly 1000 may further comprise a plurality of support wires 112 as a means to further impart structural integrity. At one end, support wires 112 are attached to base 102 through wire anchor 116. At the other end, support wires 112 are attached to the upright frame at selected points along left elongate side member 106 and right elongate side member 108.

To complete assembly of a noise reducing unit, sound abatement blankets are facially attached to frame assembly 1000. This is typically achieved by drawing bindings through the grommets of the sound abatement blanket and thereafter tying the bindings around selected points along left side elongate member 106, right side elongate member 108 and top elongate member 104. Any variety of bindings may be used to accomplish such assembly. Flexible plastic straps have be used with positive results.

Once assembled, the noise reducing unit may be used as a component in the construction of a variety of noise reducing constructions.

Figure 9:
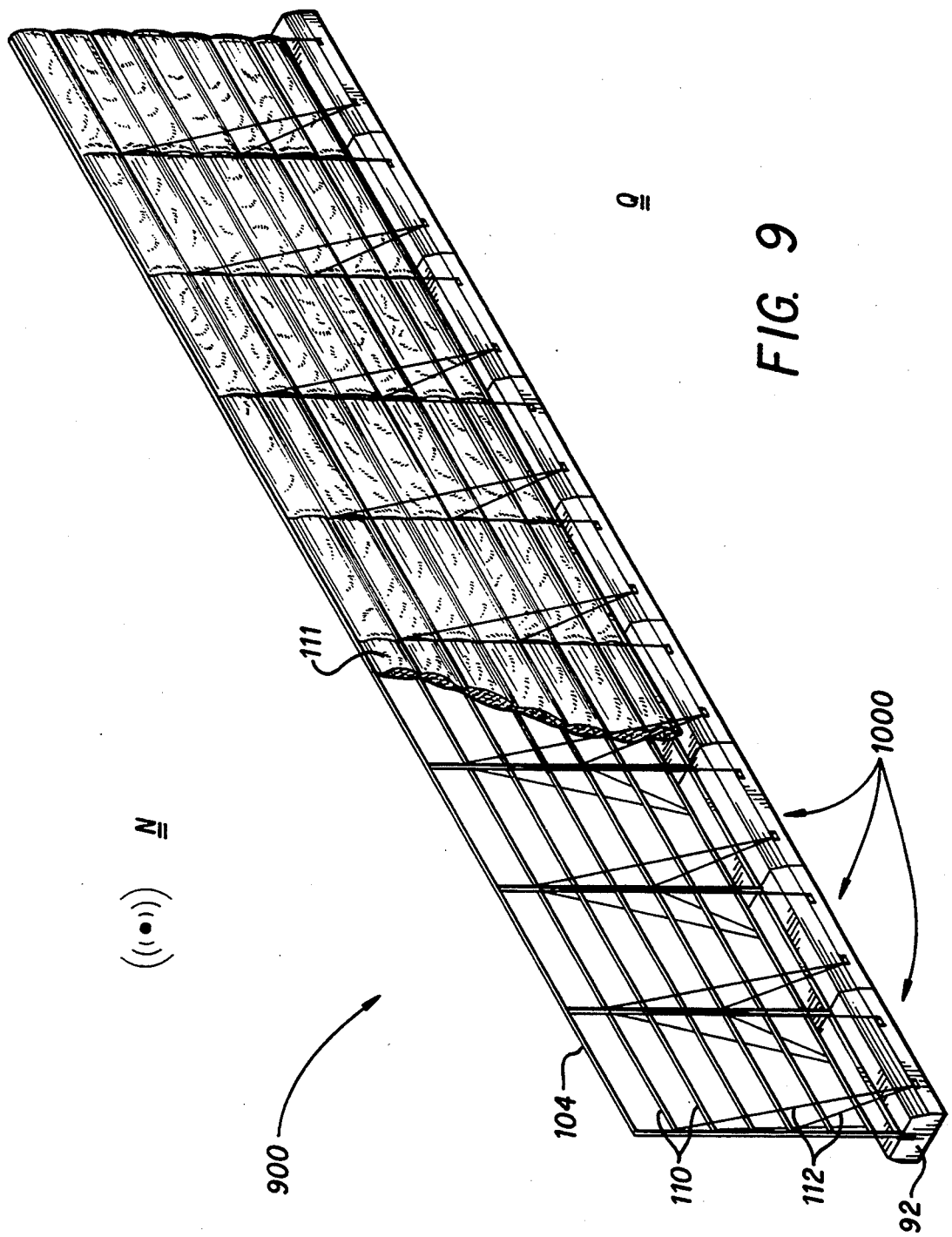
FIG. 9 illustrates a partial cut-away view of one possible sound abatement wall made from a plurality of noise reduction units.

One method of utilizing noise reducing units is represented by FIG. 9 which illustrates a noise reduction wall 900. In assembling noise reduction wall 900, one should first identify a noise generating point source N and then identify a desired noise abatement zone Q. Example of noise generating point sources include, but are not limited to heavy industrial construction sites, highways, freeways, and internal combustion engines, pumping equipment, generators, air compressors, jackhammers, and other noisy equipment.

After identifying noise generating point source N and noise abatement zone Q, noise reduction wall 900 is erected between noise generating point source N and noise abatement zone Q. Noise reduction wall 900 is assembled by linearly placing a plurality of frame assembly 1000 in adjacent succession to form a wall. Placement need not be absolutely linear and may vary depending on the physical geography of the assembly site.

In determining the desired noise abatement zone Q, its should be kept in mind that, in utilizing the present methods and apparatus, normal decibel (dB) reductions or Noise Level Reductions (NLR's) vary depending upon the actual situation; typically, a reduction of 15–40 db's can be achieved at 50 feet. Based on the information disclosed herein, one skilled in the art would be able to determine the appropriate interrelationship between the location and intensity of the noise generating point source and the relative positioning of noise reduction barrier 900, and thereby extrapolate the extent of the noise abatement zone Q. With the information disclosed herein and through standard computations, predetermination of noise abatement zone Q prior to erection of noise reduction wall 900 is possible without undue experimentation.

For most construction purposes, the blankets should typically have a dimension of 10′ × ′ and weigh approximately 150 lbs. These dimensions, of course may be modified for special applications in unusual cases. Regardless, grommets in such blankets, will be located at 12′ centers along all sides for easy installation. These blanket are commonly used for sound barriers 10′, 20′ in height to mitigate industrial noises. The Sound Transmission Class (STC) for these barriers are STC-18 or STC-25.

Figure 14:
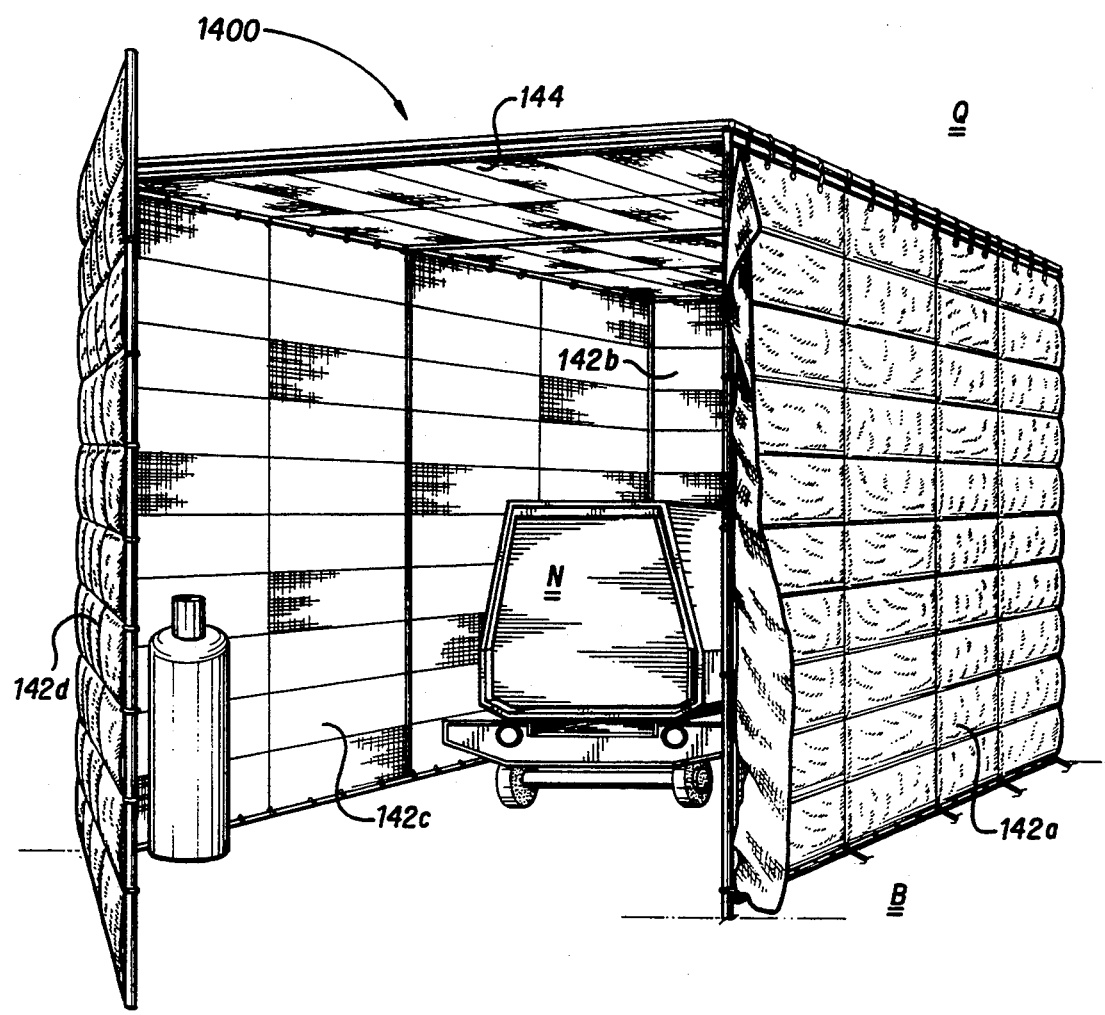
FIG. 14 illustrates an environmental view of one possible sound abatement enclosure made from modified noise reduction units.

Another method of utilizing sound abatement blankets and noise reducing units is represented by FIG. 14 which illustrates a noise reduction enclosure 1400. In assembling noise reduction enclosure 1400, one should first identify a noise generating point source N. Unlike noise reduction wall 9000, noise reduction enclosures 1400 are typically designed for smaller noise generating point sources N, such as internal combustion engines, pumping equipment, generators (as illustrated in FIG. 14), air compressors, jackhammers, and other noisy equipment. Once the noise generating point source is identified, a barrier enclosing noise generating point source N is erected from a plurality of noise reducing units. As illustrated in FIG. 14, the noise reduction enclosure may comprise a first wall 142a, a second wall 142b, a third wall 142c and a fourth wall 142d. As illustrated in FIG. 14, fourth wall 142d is designed as hinged door. In operation, fourth wall 142d is closed to form a complete enclosure and thereby creating a desired noise abatement zone Q.

As also illustrated in FIG. 14, noise reducing enclosure may also be provided with a top sound abatement blanket 144 connected to the respective top sides of first wall 142a, second wall 142b, third wall 142c and fourth wall 142d. The use of top sound abatement blanket 144 provides for a more complete enclosure. Top sound abatement blanket 144 also functions as a roof and thereby allows noise reduction enclosure to be used as a shelter during inclement weather.

In still another method of utilizing sound abatement blankets, a noise generating point source is first identified then substantially wrapped with sound abatement blankets. Again grommets and bindings may be utilized to accomplish such wrapping. It is noted, for purposes illustration and not limitation, that positive noise reduction results were achieved by wrapping a noisy oil drilling rig completely with sound abatement blankets.

Several other applications of the above disclosed principles have been successfully accomplished. The following examples show the wide range and versatility with which sound abatement blankets and noise reducing units may be used for the purpose of sound abatement. In one project, a construction site sound control barrier, 300′ long × 30′ high, was installed in six working days. In another project, a hanging double layer "curtain" 400′ long and 30′ high, designed and installed within 48 hours for temporary sound control during the construction of a bridge superstructure alongside a residential neighborhood. In other projects, temporary enclosures utilizing sound abatement blankets were constructed to reduce noise generated by portable sound enclosures for water pumps, jack hammers, compressors and internal combustion engines. Sound abatement blankets or noise reducing units may also be installed outside or within a building to control distracting sounds in all directions.

It will be understood that the claims are intended to cover all changes and modifications of the preferred embodiments of the invention, herein chosen for the purpose of illustration, which do not constitute departures from the spirit and scope of the invention.

I claim:

1. A method of manufacturing sound abatement blankets, said sound abatement blankets having a planar inner membrane, a front cover, and a back cover, comprising the following steps:
   interposing said inner membrane between said front cover and said back cover;
   peripherally connecting said inner membrane, said front cover and said back cover at a periphery with a peripheral seam juncture;
   first interiorly connecting said front cover to said inner membrane to form at least one interior front seam juncture and at least two front pockets defined by the front seam juncture and the peripheral seam juncture;
   second interiorly connecting said back cover to said inner membrane to form at least one interior back seam juncture and at least two rear pockets defined by the front seam juncture and the peripheral seam juncture such that each said interior front seam junctures are substantially non-overlapping with each said interior back seam juncture; and
   substantially filling each said front pocket and each said rear pocket with insulating material.

2. The method of claim 1, wherein said peripheral connection step, said first interior connection step, and said second interior connection step are accomplished by stitching.

3. The method of claim 1, wherein said peripheral connection step, said first interior connection step, and said second interior connection step are accomplished by gluing.

4. The method of claim 1, wherein said peripheral connection step, said first interior connection step, and said second interior connection step are accomplished by fusing.

5. The method of claim 1, whereby said insulation material is fiberglass batting.

6. The method of claim 1, wherein
   said front cover is made of a vinyl laminate material;
   said back cover is made of a vinyl laminate material; and
   said inner membrane is made of a vinyl laminate material.

7. The method of claim 1, wherein said inner membrane and said front cover are made of a vinyl laminate material, and said back cover is made of a weave type material.

8. The method of claim 7, wherein said back cover is made of a sixty percent weave type material.

9. The method of claim 1, wherein said peripheral connection step is offset from an outermost periphery of said inner membrane, said front cover and said back cover to form a peripheral flap immediately outside said peripheral seam juncture;
said peripheral flap having three layers;
said three layers comprising an outer edge of said front cover, an outer edge of said inner membrane, and an outer edge of said back cover.

10. The method of claim 9, further comprising interspacing a plurality of grommets along said peripheral flap.

11. The method of claim 10, wherein
said front cover is made of a vinyl laminate material;
said back cover is made of a vinyl laminate material; and
said inner membrane is made of a vinyl laminate material.

12. The method of claim 1, wherein
said peripheral connection step is offset from an outermost periphery of said inner membrane, said front cover and said back cover to form a peripheral flap immediately outside said peripheral seam juncture;
said peripheral flap having three layers; said three layers comprising an outer edge of said front cover, an outer edge of said inner membrane, and an outer edge of said back cover.

13. The method of claim 12, further comprising
interspacing a plurality of grommets along said peripheral flap.

14. The method of claim 13, wherein said insulation material is fiberglass batting.

15. The method of claim 13, wherein
said front cover is made of a vinyl laminate material;
said back cover is made of a vinyl laminate material; and
said inner membrane is made of a vinyl laminate material.

16. The method of claim 12, wherein said insulation material is fiberglass batting.

17. The method of claim 12, wherein
said front cover is made of a vinyl laminate material;
said back cover is made of a vinyl laminate material; and
said inner membrane is made of a vinyl laminate material.

* * * * *